(12) United States Patent
Diprose et al.

(10) Patent No.: US 12,029,210 B2
(45) Date of Patent: Jul. 9, 2024

(54) APPARATUS AND METHOD FOR ELECTRICALLY KILLING PLANTS

(71) Applicant: Ubiqutek Ltd., Birmingham (GB)

(72) Inventors: Andrew Diprose, London (GB); Michael Diprose, Hope Valley (GB)

(73) Assignee: Ubiqutek Ltd., Birmingham (GB)

( * ) Notice: Subject to any disclaimer, the term of this patent is extended or adjusted under 35 U.S.C. 154(b) by 240 days.

(21) Appl. No.: 17/425,854

(22) PCT Filed: Mar. 10, 2020

(86) PCT No.: PCT/EP2020/056365
§ 371 (c)(1),
(2) Date: Jul. 26, 2021

(87) PCT Pub. No.: WO2020/182818
PCT Pub. Date: Sep. 17, 2020

(65) Prior Publication Data
US 2022/0346365 A1    Nov. 3, 2022

(30) Foreign Application Priority Data
Mar. 11, 2019 (GB) .................................... 1903315

(51) Int. Cl.
*A01M 21/04* (2006.01)
(52) U.S. Cl.
CPC ................. *A01M 21/046* (2013.01)
(58) Field of Classification Search
CPC ...... A01M 21/00; A01M 21/02; A01M 21/04; A01M 21/043; A01M 21/046
See application file for complete search history.

(56) References Cited

U.S. PATENT DOCUMENTS

| 2,468,972 A | * | 5/1949 | Hagerty | ............... G01N 27/048 47/1.3 |
| 4,338,743 A | | 7/1982 | Gilmore | |

(Continued)

FOREIGN PATENT DOCUMENTS

| EP | 3912469 A1 * | 11/2021 | .......... A01M 21/046 |
| JP | H0622672 A | 2/1994 | |
| WO | WO-2016016627 A1 * | 2/2016 | ............... A01H 3/04 |

OTHER PUBLICATIONS

International Search Report, dated Jun. 22, 2020, in PCT/EP2020/056365, filed Mar. 10, 2020.
(Continued)

*Primary Examiner* — Ebony E Evans
(74) *Attorney, Agent, or Firm* — Dunlap Codding, P.C.

(57) ABSTRACT

An electrical apparatus to kill a plant or at least attenuate plant growth, the apparatus comprising: an power supply unit; an applicator unit comprising an applicator electrode; an return unit comprising an return electrode; electrical circuitry; the power supply unit arranged to apply electrical energy through a transmission circuit comprising the applicator electrode, and the return electrode, wherein said electrical circuitry implements a detection system to determine a condition of electrical arcing of the electrical energy from one or both of said electrodes, the electrical circuitry arranged to control the electrical energy through the transmission circuit to at least partially reduce the electrical arcing based on said determined condition of electrical arcing.

15 Claims, 5 Drawing Sheets

(56) References Cited

U.S. PATENT DOCUMENTS

| | | | | |
|---|---|---|---|---|
| 5,600,918 | A | * | 2/1997 | Carr .......................... A01B 1/00 |
| | | | | 47/1.3 |
| 5,868,920 | A | | 2/1999 | Nylund et al. |
| 11,917,989 | B2 | * | 3/2024 | Diprose ................... A01H 3/04 |
| 2006/0265946 | A1 | * | 11/2006 | Schwager ........... A01M 21/046 |
| | | | | 47/1.3 |
| 2007/0208520 | A1 | * | 9/2007 | Zhang .................... H02H 3/335 |
| | | | | 702/108 |
| 2018/0055036 | A1 | * | 3/2018 | Diprose ................ A01M 21/04 |
| 2018/0132473 | A1 | * | 5/2018 | Diprose .............. A01M 21/046 |
| 2018/0325091 | A1 | | 11/2018 | Kroeger et al. |
| 2022/0095605 | A1 | * | 3/2022 | Diprose .............. A01M 21/046 |

OTHER PUBLICATIONS

Written Opinion of the International Searching Authority, dated Jun. 22, 2020, in PCT/EP2020/056365, filed Mar. 10, 2020.

* cited by examiner

APPARATUS AND METHOD FOR ELECTRICALLY KILLING PLANTS

TECHNICAL FIELD

The present disclosure relates to electric apparatus that is configured to attenuate plant growth by the application of electrical energy thereto.

BACKGROUND

In properties both commercial and domestic, it is common to kill or at least control the growth of unwanted plants, commonly referred to as weeds. Conventional methods include treatment with a pesticide or more particularly a herbicide. However, there is a growing concern over such treatment for environmental reasons and unwanted exposure of herbicides to humans and animals. Moreover, weeds are increasingly becoming naturally resistant so herbicides are becoming more and more ineffective. As a result of these numerous drawbacks, consumers are increasingly demanding organic produce, for which the use of herbicides is prohibited.

Consequently, there is a desire for alternative treatments, which do not include the above drawbacks. An example includes treatment by the application of electrical energy. U.S. Pat. No. 4,338,743 discloses such apparatus, wherein an electrical energy is applied at 14.4 kV at 60±5 Hz to plants. Such apparatus have failed to become widespread in the market over concern over safety. For example, the high voltage may in some instances increased the risk combustion of the week and/or surrounding material, which in areas that represent fire risk, is particularly undesirable.

Therefore, in spite of the effort already invested in the development of said apparatus further improvements are desirable.

SUMMARY

The present disclosure provides electrical apparatus to kill a plant or at least attenuate plant growth. The apparatus includes a power supply unit; an applicator unit comprising an applicator electrode; an earth unit comprising an earth electrode, and; electrical circuitry. The power supply unit is arranged to apply electrical energy through a transmission circuit comprising the applicator electrode and the earth electrode and the plant.

In embodiments, the electrical circuitry implements a detection system to determine a condition of electrical arcing from one or both of said electrodes. In embodiments, the electrical circuitry is arranged to control the electrical energy through the transmission circuit to at least partially reduce the electrical arcing based on said determined condition of electrical arcing.

It has been found that prior art electrical apparatus may be susceptible to initiating fires. It has been found that this is at least partially because they may be susceptible to electrical arcing, which is caused when fluid (i.e. air/water) surrounding and comprising part of the transmission circuit becomes ionized and is thus its electrical conductivity increases. As a result the electrical potential drop over the electrodes falls substantially. Whilst under the condition of electrical arcing, a magnitude of the electrical energy required to maintain the condition is significantly lower than a magnitude to ionize the fluid and initiate the condition. Consequently, the condition can be difficult to escape.

It has been found that an electrical arc represents a substantial risk in respect of combustion of the surrounding material or human/animal contact and also in controlling the path of the transmission circuit.

It has been found that electrical arcing may worsened as the electrode moves relative the weed during treatment, e.g. due to one or more of: user movement of the electrode or other implement associated with the electrical apparatus; wind disturbing the weed; breakdown of the weed during treatment.

By implementing a detection system to detect arcing and, in response to detecting said arcing, control the electrical energy through the transmission circuitry to reduce the arcing, apparatus with improved safety may be provided.

In embodiments, said control of the electrical energy includes altering one or more of the following electrical quantities in a manner for reducing electrical arcing: electrical potential over the said electrodes; electrical current through said transmission circuit; electrical power through said transmission circuit; energy through said transmission circuit; the frequency of the electrical energy; phase between of the electrical current and voltage.

As used herein "altering" may refer to said electrical quantity being set to zero or being reduced, e.g. in respect of said electrical potential, electrical current and power and frequency. As used herein "reduced" may refer to a reduction of the magnitude of said quantity by greater than 30 or 40 or 50 or 60 or 70%. Altering may include the electrical energy being set to zero or reduced instantaneously or progressively over a period of time, e.g. it is ramped from the unaltered to the altered state. In respect of phase, altering may comprise setting the current and voltage in anti-phase, or increasing a phase difference, to reduce electrical power.

In an embodiment the electrical energy transmitted through the transmission circuit is set to zero, such that electrical potential over the said electrodes is set to zero or reduced.

By altering said electrical energy in one of the aforesaid manners an electrical arc from one or both electrodes can be attenuated and/or removed, which may improve safety.

In embodiments, said quantity is altered until the detection system determines that electrical arcing has stopped. By implementing the detection system to detect when arcing is removed in response to the electrical energy being altered in one of the aforesaid manners, the period over which the electrical energy is altered may be minimized, such that as soon as the electrical arcing is removed the electrical energy can be reapplied to the plant in a manner suitable for killing the plant. The apparatus may therefore be more efficient.

In embodiments, following determination that electrical arcing has stopped (or is suitably attenuated), the electrical circuitry is configured to reapply unaltered electrical energy through the transmission circuit. By reapplying unaltered electrical energy following removal of the electrical arcing, the apparatus may continue to effectively treat a plant. As used herein "unaltered" electrical energy may refer to electrical energy configured, including with one or more electrical quantities thereof, as it was immediately prior to the detection of electrical arcing (or with other suitable configuration for treating the plant), rather than the electrical energy in the altered configuration. Said electrical quantity may comprise one or more of the electrical potential over the said electrodes; electrical current through said transmission circuit; electrical power through said transmission circuit; frequency of the electrical energy; and phase between the electrical current and voltage.

In embodiments, the electrical circuitry is configured following the determination of the condition of electrical arcing, to implement the following steps, which may or may not be in the order presented: Step A: wait a predetermined amount of time (e.g. any integer number between 1 to 200 ms); Step B: determine with the detection system if electrical arcing still present; Step C: if electrical arcing is not present then reapply unaltered electrical energy, if electrical arcing is still present then loop to step A (and perform steps B and C again and so on until arcing not detected). As used herein "ms" refers to milliseconds.

In other embodiments said electrical quantity is altered for a predetermined amount of time, such as: up to 1 second or up to 0.5 second or up to 5 to 200 ms, e.g. 20 ms, after which the electrical energy is reapplied. In such an embodiment, there is no step of detection of electrical arcing after the predetermined amount of time to determine whether the unaltered electrical energy should be reapplied, and said unaltered electrical energy is automatically applied after said predetermined amount of time. Such an implementation may have reduced processing overhead. It will be understood that once the unaltered electrical energy is reapplied the electrical circuitry detects electrical arcing and if detected the electrical quantity may be altered for a predetermined amount of time again.

In embodiments, the unaltered electrical energy is reapplied instantaneously (i.e. immediately without a time delay). With instant application the apparatus may resume treatment of a plant efficiently.

In embodiments, the unaltered electrical energy is reapplied progressively over a period of time. With progressive application, the apparatus may resume treatment of a plant with a low likelihood of triggering electrical arcing again. The progressive application may include ramped, (e.g. progressively changed, rather than a step change) from the altered to unaltered states, and may include linear or non-linear ramping. In embodiments, the electrical circuitry is arranged to determine the condition of electrical arcing during the progressive application and if electrical arcing determined then to control the electrical energy through the transmission circuit to at least partially reduce the electrical arcing based on said determined condition of electrical arcing. The electrical energy may be controlled to be altered as defined herein. By detecting electrical arcing during said progressive application, the condition of retriggering substantial electrical arcing can be avoided, and treatment of the plant resumed as efficiently as possible.

In embodiments, said control of the electrical energy includes implementation of alternative applicator electrode and/or earth electrode for transfer of said electrical energy. It will be understood that the alternative electrode is implemented in respect of the electrode proximal to which the electrical arcing is detected. By changing the path of the electrical energy to bypass an electrode that is experiencing electrical arcing proximal thereto, treatment of a plant may continue without interruption.

In embodiments, said control of the electrical energy comprises implementation of electrical damping in the transmission circuit. By implemented electrical damping, e.g. by means or resistance and capacitance coupling, electrical arcing may be reduced.

In embodiments, the detection system comprises a camera system to detect said electrical arcing. The camera system may include one or more of any suitable system for detecting electrical arcing in any suitable waveband, e.g. visual, infrared, UV etc. By implementing a camera system for electrical arc detection, electrical arcing may be conveniently detected, including in regions distal from an associated electrode.

In embodiments, the detection system comprises a thermal sensor to detect said electrical arcing by heat generated therefrom.

In embodiments, the detection system comprises circuitry to determine the condition of electrical arcing based on a change in a property of the electrical energy. By implementing electrical circuitry to determine electrical arcing based on a change in a property of the electrical energy, the detection system may be one or more of: cost effective; low maintenance (e.g. a camera lens does not require servicing); compact (e.g. a camera does not require arranging in operative proximity to an electrode).

In embodiments, the property of the electrical energy comprises one or more of: a change in an electrical potential over said electrodes (e.g. a sudden reduction in electrical potential; a change in electrical current or power though the transmission circuit (e.g. a sudden reduction in said current/power); a reduction of electrical resistance between said electrodes; a change in phase between the current and voltage of the electrical energy; a first order time derivative of one of the aforesaid quantities above/below a threshold.

In an embodiment, the circuitry to determine the condition of electrical arcing based on a first order time derivative of the electrical potential and current, and to determine electrical arcing when the change in voltage (i.e. a drop) exceeds a threshold value and the change in current (i.e. an increase) exceeds a threshold value.

In embodiments, the detection system comprises circuitry to determine the condition of electrical arcing based on detection of electrical noise emitted due to ionized fluid from an electrical arc. The electrical noise may be in the band of at least 1500 MHz or 10 kHz to 1000 MHz, or 100 kHz to 100 MHz, or 1 MHz to 10 MHz. The electrical circuitry may be adapted to detect one or more specific frequencies or electrical noise to determine said electrical arcing.

In embodiments, the circuitry is arranged to determine the electrical noise induced in the transmission circuit or directly from the arc. The circuitry may implement a signal processing system to identify noise in said band, e.g. above a threshold. In embodiments, the detection system comprises a sensor to detect said electrical noise in the transmission circuit or directly from the arc. The sensor may be implemented as an antenna arranged to determine emissions in said frequency range.

In embodiments, a plurality of different detection systems are implemented, e.g. two or more of the following: detection system based on determining electrical noise; a detection system based on determining a change in property of the electrical energy; a detection system implementing a camera.

The present disclosure provides use of the apparatus as disclosed herein for treatment of a plant, e.g. to kill the plant. The use may implement any feature of the preceding embodiment or another embodiment disclosed herein.

The present disclosure provides a method of treating a plant with electrical energy, the method comprising: applying electrical energy to the plant between an applicator electrode and earth electrode; determining electrical arcing proximal one of said electrodes; controlling the electrical energy to reduce the electrical arcing. The method may implement any feature of the preceding embodiment or another embodiment disclosed herein. The present disclosure provides electrical circuitry or a computer program to implement the method of the preceding embodiment or another embodiment disclosed herein.

The preceding summary is provided for purposes of summarizing some embodiments to provide a basic understanding of aspects of the subject matter described herein. Accordingly, the above-described features are merely examples and should not be construed to narrow the scope or spirit of the subject matter described herein in any way. Moreover, the above and/or proceeding embodiments may be combined in any suitable combination to provide further embodiments. Other features, aspects, and advantages of the subject matter described herein will become apparent from the following Detailed Description, Figures, and Claims.

BRIEF DESCRIPTION OF THE FIGURES

Aspects, features and advantages of embodiments of the present disclosure will become apparent from the following description of embodiments in reference to the appended drawings in which like numerals denote like elements.

DETAILED DESCRIPTION OF EMBODIMENTS

Figure 1:
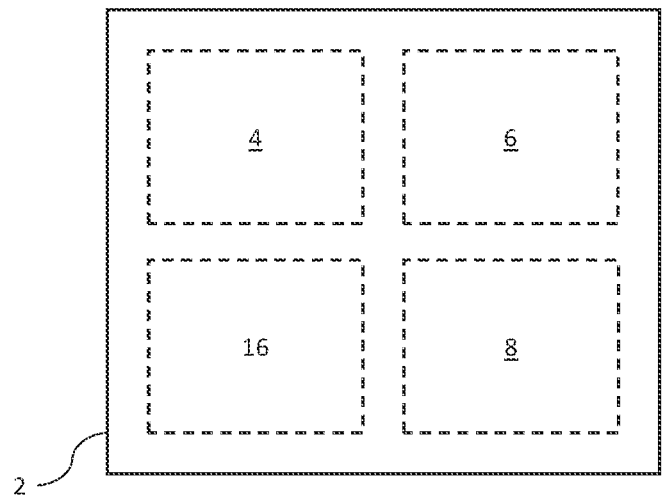
FIG. 1 is a block system diagram showing embodiment electrical apparatus to attenuate plant growth.

Before describing several embodiments of the apparatus, it is to be understood that the system is not limited to the details of construction or process steps set forth in the following description. It will be apparent to those skilled in the art having the benefit of the present disclosure that the system is capable of other embodiments and of being practiced or being carried out in various ways.

The present disclosure may be better understood in view of the following explanations:

As used herein "plant" or "weed" may refer to an undesired plant in a human controlled setting, such as a farm field, garden, lawn or park. A weed may refer to a multicellular photosynthetic eukaryote.

As used herein "electrical arc" or 'arc" may refer to an electrical breakdown of a gas that produces an electrical discharge. An arc is formed by an electrical current through a normally nonconductive medium such as air, and is characterized by a plasma, which may produce visible light. An arc discharge is characterized by a lower voltage than a glow discharge and relies on thermionic emission of electrons from the electrodes supporting the arc.

As used herein "electrical energy" may refer to the electrical energy applied to the plant, e.g though a transmission circuit. The electrical energy may comprise a periodic or aperiodic waveform, i.e. a waveform that continuously repeats with the repeating units therein having a constant or a varying period, e.g. a pulsed wave with a fixed duty cycle or a varying duty cycle. The shape of the repeating unit may be one of or a combination of one or more of the following forms: sine wave; saw-tooth wave; triangular wave; square wave; pulsed, e.g. DC pulsatile, half-wave rectified; other known form. The exact shape of the repeating unit may be an approximation of one of the aforesaid forms for reasons of distortion, e.g. overshoot/undershoot and the associated ringing and settle time. The repeating unit may be positive or negative or a combination thereof with respect to a reference value, which is typically 0 V. The frequency of the waveform may be above 18 kHz or 25 kHz. In will be understood that when referring to the voltage of the electrical energy, when the electrical energy has a waveform, the voltage is in respect of a suitable quantity, such as RMS, peak or other. The same applies for other electrical quantities such as power and current.

As used herein "camera" or 'camera system" may refer to a system comprising one or more cameras operable to capture images in a suitable band (including visible, infrared or UV) for detecting an electrical arc. A camera may include any suitable image sensor for capturing emissions, e.g. a photodiode and other semiconductor systems.

As used herein "power supply unit" or "electrical energy processing unit" may refer to any unit or system, including a distributed system, for generating and/or conditioning electrical energy for supply to a transmission circuit which, in use, incorporates a plant.

As used herein, the term "electrical circuitry" or "electric circuitry" or "electronic circuitry" or "circuitry" or "control circuitry" may refer to, be part of, or include one or more of the following or other suitable hardware or software components: an Application Specific Integrated Circuit (ASIC); electronic/electrical circuit (e.g. passive components, which may include combinations of transistors, transformers, resistors, capacitors); a processor (shared, dedicated, or group); a memory (shared, dedicated, or group), that may execute one or more software or firmware programs; a combinational logic circuit. The electrical circuitry may be centralized on the apparatus or distributed, including distributed on board the apparatus and/or on one or more components in communication with the apparatus, e.g. as part of the system. The component may include one or more of a: networked-based computer (e.g. a remote server); cloud-based computer; peripheral device. The circuitry may be implemented in, or functions associated with the circuitry may be implemented by, one or more software or firmware modules. The circuitry may include logic, at least partially operable in hardware.

As used herein, the term "processor" or "processing resource" may refer to one or more units for processing including as an ASIC, microcontroller, FPGA, microprocessor, digital signal processor (DSP) capability, state machine or other suitable component. A processor may include a computer program, as machine readable instructions stored on a memory and/or programmable logic. The processor may have various arrangements corresponding to those discussed for the circuitry, e.g. on-board and/or off board the apparatus as part of the system.

As used herein, the term "computer readable medium/media" or "data storage" may include conventional non-transient memory, for example one or more of: random access memory (RAM); a CD-ROM; a hard drive; a solid state drive; a flash drive; a memory card; a DVD-ROM; a floppy disk; an optical drive. The memory may have various arrangements corresponding to those discussed for the circuitry/processor.

As used herein, the term "information carrying medium" may include one or more arrangements for storage of information on any suitable medium. Examples include: data storage as defined herein; a Radio Frequency Identification (RFID) transponder; codes encoding information, such as optical (e.g. a bar code or QR code) or mechanically read codes (e.g. a configuration of the absence or presents of cut-outs to encode a bit, through which pins or a reader may be inserted).

As used herein "applicator unit" or "applicator" may refer to any suitable device for applying electrical energy to a plant, including by direct contact with the plant and/or spark transmission.

As used herein "earth unit" or "return unit" may refer to any suitable device for receiving electrical energy from a circuit including the plant and optionally the ground to complete a transmission circuit, including by direct contact with the plant and/or spark transmission.

As used herein "apparatus" or "electrical apparatus" may refer to any combination of one or more of the following for treatment of a plant: power supply unit; electrical circuitry; applicator unit; earth unit; earth electrode; applicator electrode; transmission circuit.

Figure 2:
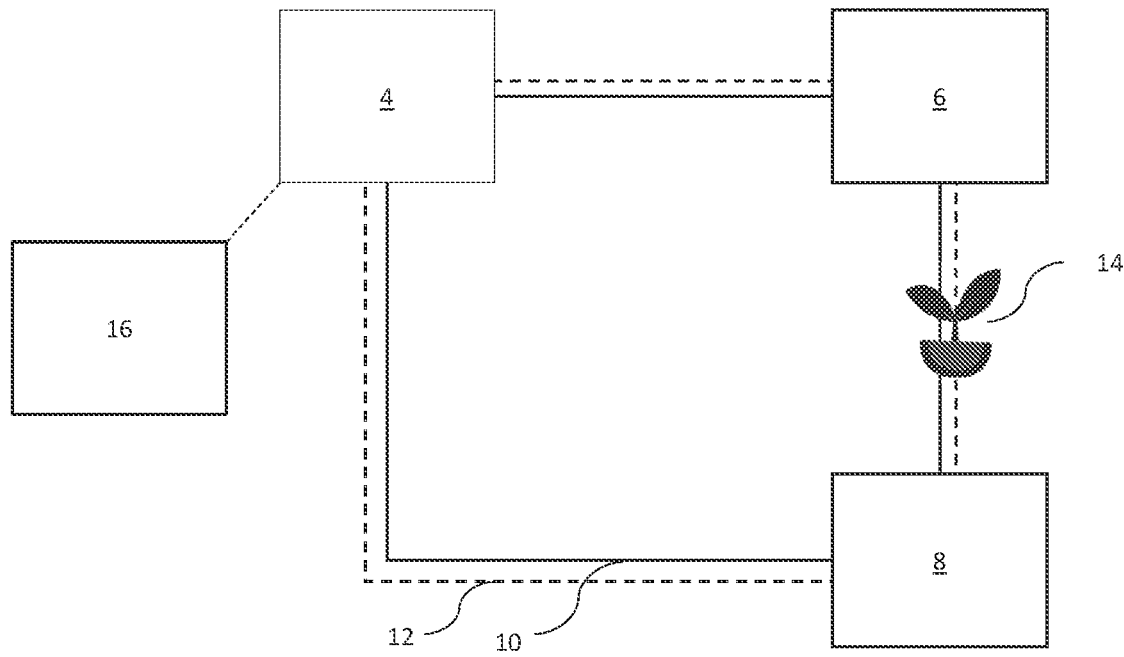
FIG. 2 is a schematic diagram showing the apparatus of FIG. 1.

Referring to FIGS. 1 and 2, electrical apparatus 2 to attenuate plant growth, comprises an electrical energy supply unit 4, an applicator unit 6 and an earth unit 8. The electrical energy supply unit supplies electrical energy 10 around a transmission circuit 12, which includes the applicator unit 6, earth unit 8.

The transmission circuit 12, when treating a plant, may include said plant 14. It will be understood that depending of the operative arrangement of the applicator unit and earth unit, a return path of the transition circuit 12 optionally includes other matter, such as proximal earth and fluid (e.g. air and moisture) to the plant.

The apparatus 2 includes electrical circuitry 16, which may implement a range of control operations. In embodiments, said circuitry 16 is operable to control the electrical energy supplied by the electrical energy supply unit 4 through the transmission circuit 12, as will be discussed.

Figure 3:
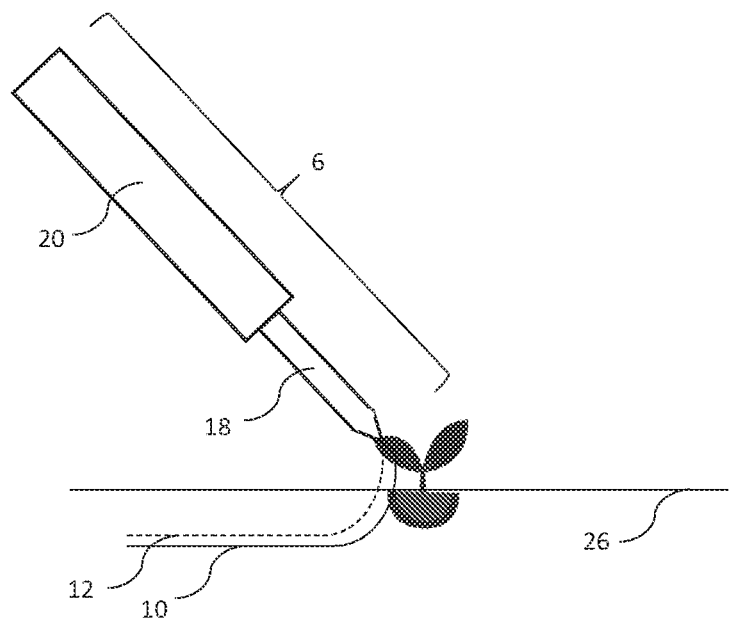
FIG. 3 is a schematic diagram showing an applicator unit of the apparatus of FIG. 1.

Referring to FIG. 3, the applicator unit 6 is adapted to receive electrical energy 10 from the electrical energy supply unit 4 and to transmit said electrical energy 10 to the plant 14 (shown in FIG. 2). The applicator unit 6 comprises an applicator electrode 18. The applicator electrode 18 is electrically connected to the electrical energy supply unit 4 by an electrically conductive material, e.g. by wiring or solid material, which forms part of the transmission circuit 12.

The applicator electrode 18 is adapted to apply the electrical energy 10 to the plant 14. In embodiments, the applicator electrode 18 is arranged for direct contact with the plant 14. As used herein "direct contact" may refer to physical contact between the plant and electrode, and may be achieved by operatively arranging the electrode to be exposed from a body of the applicator. The applicator electrode 18 comprises an electrically conductive material e.g. copper, zinc, bronze, brass, aluminum or steel.

The geometric configuration of the applicator electrode may be selected depending on the intended treatment regimen, for example: a rod for sweeping through areas of dense plants; a hook-shape for separating plants.

The applicator unit 6 comprises body 20 to carry the applicator electrode 18. The body 20 may be adapted to be held by a user or fixed to a chassis depending on the particular configuration of the apparatus 2 (e.g. adapted for domestic or agricultural implementation respectively).

In embodiments, which are not illustrated, the applicator electrode is implemented as a plurality of electrodes, e.g. for treatment of multiple plants at a given moment.

Figure 4:
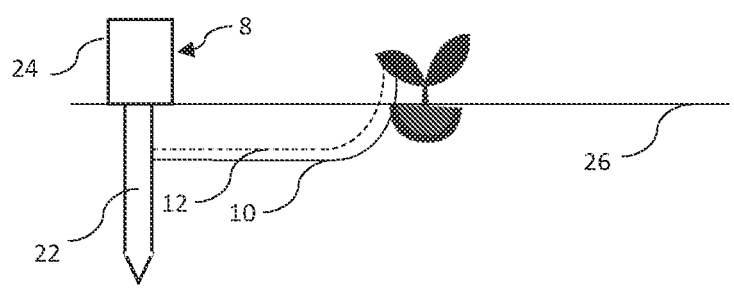
FIG. 4 is a schematic diagram showing an earth unit of the apparatus of FIG. 1.

Referring to FIG. 4, the earth unit 8 is adapted to receive electrical energy 10 from the electrical energy supply unit 6 via the plant 14 (shown in FIG. 2). The earth unit 8 comprises an earth electrode 22. The earth electrode 22 is electrically connected to the electrical energy supply unit 4 by an electrically conductive material, e.g. by wiring or solid material, which forms part of the transmission circuit 12.

The earth electrode 22 is adapted to provide a return for electrical energy 10 via the plant 14 to complete the transmission circuit 12. In embodiments, the earth electrode 22 is arranged for direct contact with the ground 26 (shown in FIG. 4). As used herein "direct contact" may refer to physical contact between the ground and electrode, and may be achieved by operatively arranging the electrode to be exposed from a body of the earth unit. The applicator electrode 18 comprises an electrically conductive material e.g. copper, zinc, bronze, brass, aluminum or steel.

The geometric configuration of the earth electrode may be selected depending on the intended implementation of the apparatus, for example: an implement for insertion into the ground (e.g. for apparatus that in use remains in a generally fixed position), such as a rod or spike; an implement for movement along the ground (e.g. for apparatus that in use has a variable position), such as a rod or spike), such as a flat plate or roller, and; a combination of the aforesaid implementations.

The earth unit 8 comprises body 24 to carry the earth electrode 22. The body 24 may be adapted to be held by a user or fixed to a chassis depending on the particular configuration of the apparatus 2 (e.g. adapted for domestic or agricultural implementation respectively).

In embodiments, which are not illustrated, the earth electrode is implemented as a plurality of electrodes, e.g. for treatment of multiple plants at a given moment.

Generally, the apparatus 2 is arranged with the earth electrode 22 arranged in operative proximity to the applicator electrode 18. Operative proximity may refer to a geometric arrangement to limit the path of the electrical energy 10 through the ground 26, which may advantageous for reasons of efficient and/or electrical safety.

Figure 5:
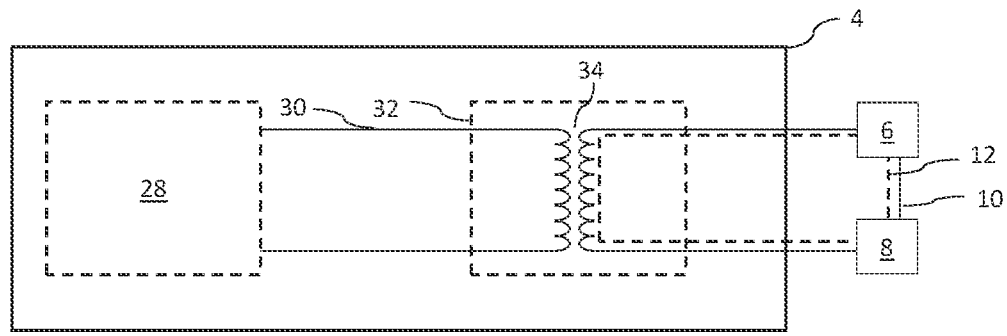
FIG. 5 is a schematic diagram showing a power supply unit of the apparatus of FIG. 1.

Referring to FIG. 5, the electrical energy supply unit 4 is arranged to supply electrical energy to the transmission circuit 12. The electrical energy supply unit 4 includes a power supply 28 for supply of supply electrical energy 30. The power supply 28 may be implemented as one or more of the following: a battery; a fuel cell; a generator, including an internal combustion engine powered generator, which may be implemented with a dedicated internal combustion engine or a shared internal combustion engine for other agricultural equipment, e.g. a tractor; other like system. The power supply 28 provides supply electrical energy 30, in alternating current (AC) or direct current (DC), including pulsated or with other form, with a fixed quantity, e.g. in one or more or power; voltage; current; frequency; phase.

The electrical energy supply unit 4 includes an electrical energy processing unit 32 for processing of the supply electrical energy 30 to the electrical energy 10, which may be referred to as processed electrical energy. The power supply unit 32 includes an electrical transformer 34 with appropriately configured windings, e.g. for step-up or step down, depending of the configuration of the supply electrical energy 30 and desired output of the electrical energy 10.

In embodiments, the electrical energy processing unit 32 implements a converter (not shown) to convert the supply electrical energy 30 to include a waveform suitable for the electrical transformer 34, e.g. AC or DC with pulsating or other variable waveform. As an example, wherein the power supply is an internal combustion engine powered generator, the converter implements an AC to DC converter and a switching system, e.g. a MOSFET, to switch the DC electrical energy though the electrical transformer 34. As an example, wherein the power supply is a battery, the converter implements said switching system to switch the DC electrical energy though the electrical transformer 34.

In embodiments of the electrical energy supply unit 4, which are not illustrated, the power supply 28 supplies electrical energy 10 of the desired configuration, consequently, the electrical energy processing unit 32 may be obviated, or in other embodiments the electrical transformer thereof may be obviated, whilst retaining the converter. In embodiments of the electrical energy supply unit 4, which are not illustrated, the electrical energy processing unit 32 includes an input unit to receive a commercial or domestic electrical supply, e.g. a mains supply, thus obviating the power supply 28.

The electrical circuitry 16 is implemented to control the electrical energy 10, through the transmission circuit 12. Said control may implement control of one or more of the following electrical quantities: electrical potential between the applicator and earth electrodes (e.g. by changing the taping over the transformer, which may be implemented as a variable transformer) and/or the frequency of the electrical energy; electrical current control (e.g. by changing the taping over the transformer, which may be implemented as a variable transformer); frequency control (e.g. by control of the switching system); phase (e.g. by implementing capacitance and/or inductance in the transmission circuit).

Figure 6:
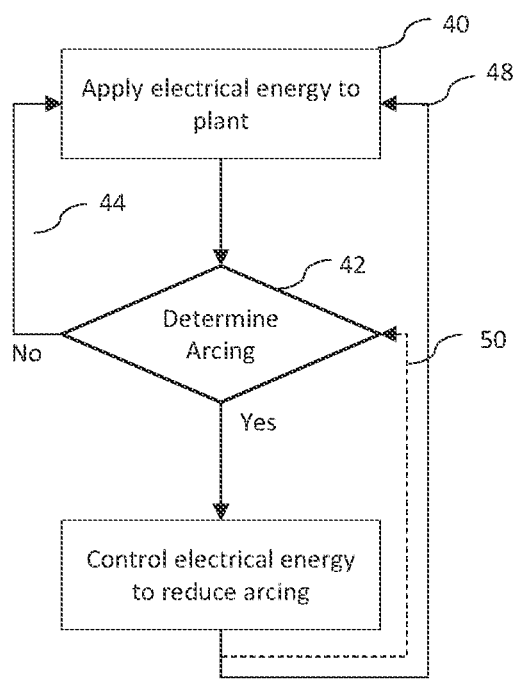
FIG. 6 is a flow diagram showing embodiment processes implemented by the apparatus of FIG. 1.

Referring to FIG. 6, in embodiments, the electrical circuitry 16 at block 40 applies the electrical energy 10 to the plant 14 via the transmission circuit 12. During said application the electrical circuitry 16 implements a detection system to determine a condition of electrical arcing from one or both of the applicator electrode 18 and earth electrode 22. Accordingly, at block 42 the electrical circuitry 16 checks for electrical arcing. If no electrical arcing is determined then loop 44 is executed to maintain the electrical energy 10 through the transmission circuit 12 to the plant 14. If electrical arcing is detected then block 46 is executed and the electrical circuitry 16 controls the electrical energy 10 through the transmission circuit 12 to at least partially reduce the electrical arcing. Following block 46 loop 48 may be executed to reapply the electrical energy 10 to the plant 14 as will be discussed. Example detection systems, further logic implementations and modes for controlling the electrical energy to reduce electrical arcing are discussed in the following examples.

In embodiments, the detection system implements a camera system to detect said electrical arcing from the applicator electrode 18 and/or earth electrode 22. It will be understood that electrical arcing may be determined by detection of emissions proximal an electrode in various spectra, e.g. infrared, ultraviolet, and visual. The camera system may include one or more cameras disposed to capture image data proximal the electrode, e.g. it may be mounted to the aforedescribed body of the earth unit/applicator unit. The electrical circuitry 16 may implement processes for image processing to determine electrical arcing from the image data, e.g. by establishing arcing when a particular intensity is observed in said spectra.

In embodiments, the detection system comprises the circuitry 16 to determine the condition of electrical arcing based on a change in a property of the electrical energy 10 through the transmission circuit 12. It will be understood that electrical arcing in the transmission circuit 12 causes a change in the load between the electrodes, which can be identified by a change in the electrical energy. Particularly, ionization of the fluid (e.g. the air) through which the electrical energy is transmitted causes a sudden reduction in electrical resistance, which can be identified as a sudden decrease in electrical potential between the electrodes. Hence the circuitry 16 can be configured to identify said sudden reduction in the electrical potential. In an embodiment, the circuitry 16 may calculate a first order time derivative of the electrical potential, and determine the condition of electrical arcing when this exceeds (i.e. the decrease) a threshold value and/or if the drop in electrical potential between the electrodes drops bellow and other threshold value. It will be understood that said threshold values are specific to the implementation of the circuitry 16 another components of the apparatus 2. It will be understood that the reduction may be distinguished by said circuitry against a short circuit since the electrical arcing still has a drop in electrical potential.

In an embodiment, the circuitry 16 may determine electrical arcing based on a change in the electrical current or power. In an embodiment, the circuitry 16 may calculate a first order time derivative of the current/power, and determine the condition of electrical arcing when this exceeds (i.e. increases) a threshold value and/or if the current/power exceeds another threshold value. It will be understood that said threshold values are specific to the implementation of the circuitry 16 and other components of the apparatus 2.

In a particular embodiment, the circuitry 16 may determine electrical arcing based on a change in one or more properties of the electrical energy. For example, the circuitry 16 may calculate a first order time derivative of the electrical potential and current, and determine electrical arcing when the change in voltage (i.e. a drop) exceeds a threshold value and the change in current (i.e. an increase) exceeds a threshold value.

In embodiments, the detection system comprises circuitry 16 to determine the condition of electrical arcing based on detection of electrical noise emitted due to ionized fluid from an electrical arc. In particular, said noise is from an electrical current that flows in the plasma, wherein the ions in the plasma are accelerated and decelerated as they collide and give off radiation. Since said processes are random the noise is broadband. For example, the electrical noise may be in the band of at least 10 kHz to 1000 MHz or 100 kHz to 100 MHz or 1 MHz to 10 MHz. The electrical circuitry may be adapted to detect one or more specific frequencies of electrical noise to determine said electrical arcing.

In embodiments, the detection system comprises a sensor (not shown) to detect said electrical noise in said frequency ranges. The sensor may be implemented as an antenna or a coil with either an air core or a ferrite type core, or other arrangement, depending on bandwidth selected. In an embodiment, the sensor is arranged proximal an arc, e.g. proximal an electrode 18, 22. In an embodiment, the sensor is arranged in operative proximity to a line of the transmission circuit 12, e.g. the sensor is a coil wrapped around an electrical energy supply line.

The circuitry 16 implements a system to determine the present of said electrical noise from a signal from the sensor. In an embodiment, it composes a single processing system, such as a filter, rectifier and smoothing. The signal processing system may digitized for digital processing or process an analogue signal, e.g. to go to level detectors and switches. In a variant embodiment, the detection system comprises a filter arranged to filter said frequency band from the transmission circuit 12, and process as discussed as above.

At block 46 the electrical circuitry 16 implements the control of the electrical energy 10 from an unaltered state (block 40) to an altered state. For example, the altered state may comprise one or more of: reduction or setting to zero the voltage of the electrical energy 10; reduction or setting to zero of the electrical current or power of the electrical energy 10; increasing a phase difference (e.g. up to antiphase) between of the electrical current and voltage of the electrical energy 10. It will be understood that the relevant electrical quantity can be altered by control of the transformer 34 tapping, the switching system or by other suitable implementations, as discussed previously.

In embodiments, the electrical quantity may be set to zero or reduced instantaneously. In embodiments, the electrical quantity may be set to zero or reduced progressively over a period of time, e.g. it is ramped from the unaltered to the altered state.

In a specific example, the voltage is reduced from 2 kV, 4 kV, 8 kV, 16 kV, 32 kV to zero instantaneously, e.g. the electrical circuitry 16 controls the switching system to cut the electrical energy 30 to the transformer 34. In other embodiment the switching system is implemented in the transmission circuit 12.

Referring to FIG. 6, in an embodiment, following on from block 46 alternative loop 50 may be executed such that block 42 is executed again before block 40 (i.e. with the electrical energy in the altered state). In particular, loop 50 may be continuously executed or periodically, e.g. every 0.5 or 1 ms, executed, until electrical arcing is no longer detected and loop 44 is executed to execute block 40 and return the electrical energy to the unaltered state. The "unaltered state" for the reapplied electrical energy may refer to electrical energy configured, including with one or more electrical quantities thereof, as it was immediately prior to the detection of electrical arcing (or with other suitable configuration for treating the plant), rather than the electrical energy in the altered state. Hence the unaltered state may also be referred as a plant treatment state and the altered state may be referred to as an arc reduction state.

Figure 7:
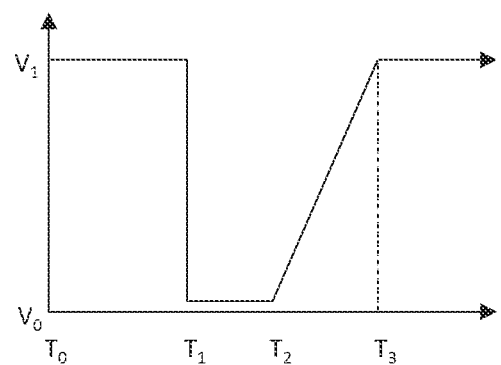
FIGS. 7 and 8 are graphical plots showing embodiment processes implemented by the apparatus of FIG. 1.

Referring to FIG. 7, in embodiments the unaltered electrical energy is reapplied progressively over a period of time. From T0 to T1, prior block 40 is executed with the electrical energy 10 configured for treatment of the plant 14. At T1 block 42 determines electrical arcing. Consequently, at T1 to T2 block 46 is executed to adjust the electrical energy 10 to one of the aforedescribed altered states suitable for electrical arc reduction. In the example embodiment, the voltage is set from V1 to zero at V0. At T2 to T3 the electrical energy 10 is increase from the altered state to the unaltered state (e.g. the same as T0 to T1 or other suitable configuration for killing the plant).

In variant embodiments, which are not illustrated, the increase between T2 and T3 includes one or more of the following profiles or other profile: non-linear, including curved or exponential, e.g. exponentially increasing; stepped, including piecewise stepped; linear, including piecewise linear.

Figure 8:
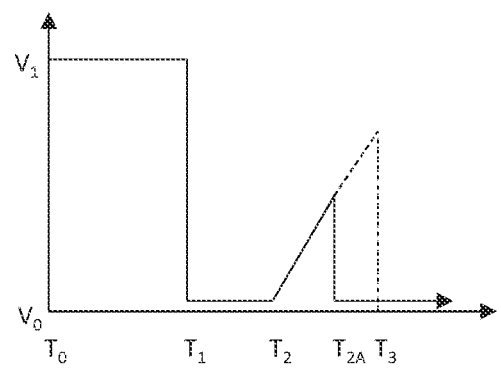

Referring to FIG. 8, a variant of the embodiment of FIG. 7 is illustrated, wherein during said increase between T2 and T3, block 42 is executed (e.g. continuously or periodically) to determine if electrical arcing has reestablished. If reestablished, as shown at T2A, the electrical energy 10 is set to the altered state and the previously discussed conditions as from T1 are re-executed.

In variant embodiments of the above, which are not illustrated, the increase between T2 and T3 includes one or more of the following profiles or other profile: non-linear, including curved or exponential; stepped, including piecewise stepped; linear, including piecewise linear. In embodiments, the unaltered electrical energy is reapplied instantaneously, e.g. it is stepped up from the altered to the unaltered state such that the time period between T2 and T3 is infinitely small.

Figure 9:
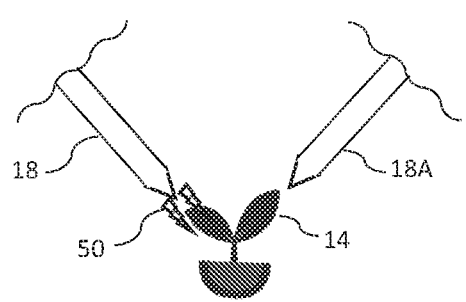
FIG. 9 is a schematic diagram showing an embodiment applicator unit of the apparatus of FIG. 1.

In embodiments, said control of the electrical energy to reduce electrical arcing may be alternatively implement. Referring to FIG. 9, in an embodiment, control of the electrical energy includes implementation of alternative applicator electrode 18A when electrical arcing 50 is detected proximal applicator electrode 18. Applicator electrode 18A is arranged, in respect of applicator electrode 18, to provide an alternative path to the plant 14 to bypass the electrical arc 50. The electrical circuitry 16 may, upon determination of an electrical arc 50 proximal electrode 18, switch from electrode 18 to electrode 18A by means of a switching system (not shown) arrange in the transmission circuit 12. In an embodiment, if an electrical arc is detected proximal electrode 18A immediately after switching (e.g. by the detection system according to any of the preceding embodiments, which may be the same detection system or a dedicated detection system for electrode 18A), then the electrical energy 10 (e.g. to either or both of electrodes 18 or 18A) may be controlled to the altered state as discussed for and of the preceding embodiments.

In apparatus comprising multiple applicator electrodes, which are concurrently supplied the electrical energy 10 (e.g. for treatment of multiple plants at a given moment), the electrical circuitry 16 may implement detection and control of electrical energy 10 to each electrode, as discussed for any of the preceding embodiments. In an embodiment, when electrical arcing is detected at one electrode, the circuitry may bypass this electrode and divert the electrical energy to the other electrodes. The bypassed electrode may have the altered electrical energy applied thereto and remain bypassed until the unaltered electrical energy is reapplied according to any of the preceding embodiment processes.

Whilst the preceding embodiments make reference to the applicator electrode, it will be understood that they may also be implemented in response to the earth electrode.

In variant embodiments, which are not illustrated, said control of the electrical energy comprises implementation of electrical damping in the transmission circuit. By implemented electrical damping, e.g. by means or resistance and capacitance coupling, electrical arcing many be reduced. The electrical circuitry may, upon determination of an electrical arc, switch by means of a switching system (not shown), the transmission circuit include additional resistance and capacitance for said electrical damping.

It will be appreciated that any of the disclosed methods (or corresponding apparatuses, programs, data carriers, etc.) may be carried out by either a host or client, depending on the specific implementation (i.e. the disclosed methods/apparatuses are a form of communication(s), and as such, may be carried out from either 'point of view', i.e. in corresponding to each other fashion). Furthermore, it will be understood that the terms "receiving" and "transmitting" encompass "inputting" and "outputting" and are not limited to an RF context of transmitting and receiving radio waves. Therefore, for example, a chip or other device or component for realizing embodiments could generate data for output to another chip, device or component, or have as an input data from another chip, device or component, and such an output or input could be referred to as "transmit" and "receive"

including gerund forms, that is, "transmitting" and "receiving", as well as such "transmitting" and "receiving" within an RF context.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

As used herein, any machine executable instructions, or compute readable media, may carry out a disclosed method, and may therefore be used synonymously with the term method, or each other.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

LIST OF REFERENCES

2 Electrical apparatus
4 Electrical energy supply unit
28 Power supply
32 Electrical energy processing unit
34 Electrical transformer
6 Applicator unit
18 Applicator electrode
20 Body
8 Earth unit
22 Earth electrode
24 Body
10 Electrical energy
30 Supply electrical energy
12 Transmission circuit
16 Electrical circuitry
14 Plant
26 Ground

The invention claimed is:

1. An electrical apparatus to kill a plant or at least attenuate plant growth, the apparatus comprising:
a power supply unit;
an applicator unit comprising an applicator electrode;
a return unit comprising a return electrode;
electrical circuitry;
the power supply unit arranged to apply electrical energy through a transmission circuit comprising the applicator electrode, and the return electrode, wherein said electrical circuitry implements a detection system to determine a condition of electrical arcing of the electrical energy from one or both of said electrodes, the electrical circuitry arranged to control the electrical energy through the transmission circuit to at least partially reduce the electrical arcing based on said determined condition of electrical arcing; and
wherein the electrical apparatus further comprises at least one of:
a camera system to detect the electrical arcing;
a thermal sensor to detect the electrical arcing by heat generated therefrom; and
the detection system being arranged to determine the electrical arcing by determining electrical noise caused by the electrical arcing.

2. The apparatus of claim 1, wherein said control of the electrical energy includes altering one or more of the following electrical quantities to at least partially attenuate electrical arcing: electrical potential over the said electrodes; and electrical current through said transmission circuit; and electrical power through said transmission circuit; the frequency of the electrical energy; phase between of the electrical current and voltage.

3. The apparatus of claim 2, wherein said electrical quantity is altered until the detection system determines that electrical arcing has stopped.

4. The apparatus of claim 3, wherein following determination that electrical arcing has stopped, the electrical circuitry is further configured to reapply unaltered electrical energy through the transmission circuit.

5. The apparatus of claim 4, wherein the unaltered electrical energy is reapplied instantaneously.

6. The apparatus of claim 4, wherein the unaltered electrical energy is reapplied progressively over a period of time.

7. The apparatus of claim 6, wherein the electrical circuitry is arranged to determine the condition of electrical arcing during the progressive reapplication and if electrical arcing determined then to control the electrical energy through the transmission circuit to at least partially reduce the electrical arcing based on said determined condition of electrical arcing.

8. The apparatus of claim 2, wherein the electrical circuitry is configured to execute the following machine executable steps following the determination of the condition of electrical arcing:
Step A: wait a predetermined amount of time;
Step B: determine with the detection system if electrical arcing is still present;
Step C: if electrical arcing not present then reapply unaltered electrical energy, if the electrical arcing is still present then loop to step A.

9. The apparatus of claim 2, wherein said electrical quantity is altered for a predetermined amount of time after which unaltered electrical energy is reapplied.

10. The apparatus of claim 1, wherein said control of the electrical energy includes implementation of alternative applicator electrode and/or return electrode for transfer of said electrical energy.

11. The apparatus of claim 1, wherein said control of the electrical energy comprises implementation of electrical damping in the transmission circuit.

12. A method of treating a plant with electrical energy using the electrical apparatus of claim 1, the method comprising:
applying electrical energy to the plant between the applicator electrode and the return electrode of the electrical apparatus;
determining electrical arcing proximal one of said electrodes;
controlling the electrical energy to reduce the electrical arcing.

13. An electrical apparatus to kill a plant or at least attenuate plant growth, the apparatus comprising:
a power supply unit;
an applicator unit comprising an applicator electrode;
a return unit comprising a return electrode;
electrical circuitry;
the power supply unit arranged to apply electrical energy through a transmission circuit comprising the applicator electrode and the return electrode, wherein said electrical circuitry implements a detection system to determine a condition of electrical arcing of the electrical energy from one or both of said electrodes, the electrical circuitry arranged to control the electrical energy through the transmission circuit to at least partially reduce the electrical arcing based on said determined condition of electrical arcing, and wherein the detection system comprises circuitry to determine the condition of electrical arcing based on a change in a property of the electrical energy.

14. The apparatus of claim 13, wherein the property of the electrical energy comprises one or more of: a change in an electrical potential over said electrodes; a change in electrical current or power though the transmission circuit; a reduction of electrical resistance between said electrodes; a change in phase between the current and voltage of the electrical energy; electrical noise due to the electrical arcing; a first order time derivative of one of the aforesaid quantities, above/below a threshold.

15. A method of treating a plant with electrical energy using the electrical apparatus of claim 13, the method comprising:
applying electrical energy to the plant between the applicator electrode and the return electrode of the electrical apparatus;
determining electrical arcing proximal one of said electrodes;
controlling the electrical energy to reduce the electrical arcing.

* * * * *